United States Patent [19]
Handjani nee Vila et al.

[11] 3,846,556
[45] Nov. 5, 1974

[54] WATER-IN-OIL EMULSIONS, COSMETIC PRODUCTS MADE THEREFROM AND METHOD OF MAKING SAID COSMETIC PRODUCTS

[75] Inventors: Rose-Marie Handjani nee Vila; Arlette Zabotto nee Arribau, both of Paris, France

[73] Assignee: Societe Anonyme dite: L'Oreal, Paris, France

[22] Filed: Mar. 21, 1972

[21] Appl. No.: 236,785

[30] Foreign Application Priority Data
Mar. 29, 1971 Luxembourg.......................... 62873

[52] U.S. Cl...................... 424/364, 424/63, 424/64, 424/319, 424/358, 424/365
[51] Int. Cl............................................. A61k 27/00
[58] Field of Search...................... 424/364, 365

[56] References Cited
UNITED STATES PATENTS

| | | | |
|---|---|---|---|
| 3,118,810 | 1/1964 | Vonkennel.......................... | 424/365 |
| 3,210,248 | 10/1965 | Feldmann et al.................. | 424/365 |
| 3,419,665 | 12/1968 | Lachampt et al.................. | 424/365 |
| 3,536,816 | 10/1970 | Kellner.............................. | 424/365 |

FOREIGN PATENTS OR APPLICATIONS

| | | | |
|---|---|---|---|
| 689,937 | 7/1964 | Canada.............................. | 424/359 |

*Primary Examiner*—Frederick E. Waddell
*Attorney, Agent, or Firm*—Cushman, Darby & Cushman

[57] ABSTRACT

Water-in-oil emulsion usefully employed in the preparation of cosmetics for the skin comprising a discontinuous aqueous internal phase, a continuous oil external phase and an emulsifying agent comprising a mixture of (a) a metal or alkaline earth metal lanolate and (b) hydrogenated lanolin or lanolin alcohol.

6 Claims, No Drawings

WATER-IN-OIL EMULSIONS, COSMETIC PRODUCTS MADE THEREFROM AND METHOD OF MAKING SAID COSMETIC PRODUCTS

The present invention relates to a water-in-oil emulsion, to an emulsifier to produce the same and to cosmetic compositions based on said water-in-oil emulsion.

It has long been considered advantageous to be able to produce cosmetic compositions such as a moisturizing cream for the body, rouge, make-up formulations and the like in the form of water-in-oil emulsions because it has been found that the water retained in a dispersed state in the oil phase has a desirable moisturizing and protective effect on the skin.

However, it has often been found difficult to produce cosmetic products of this type commercially because conventional water-in-oil emulsions have generally exhibited several drawbacks.

For instance, it is necessary that the water-in-oil emulsion does not reverse its phases, i.e., it does not transform itself into an emulsion of the oil-in-water type by aqueous dilution.

Also, it is necessary that the cosmetic products be in the form of emulsions which are sufficiently stable to maintain their finely dispersed structure, even though stored for as long as several years, and despite substantial changes in temperature which tend to promote breakdown of the emulsion as a consequence of loss of the aqueous phase from the dispersed state, which is particularly likely to happen when the emulsion is subjected to low temperatures.

Heretofore, water-in-oil emulsions comprising a discontinuous aqueous internal phase, a continuous oil external phase and an emulsifying agent generally employed such materials as lanolin, polycyclic alcohols as sterols and high molecular weight aliphatic alcohols which are for the most part the constituents of waxes as the emulsifying agent with lanolin being the most widely used. However, the use of lanolin as an emulsifier exhibited several disadvantages. Lanolin has a disagreeable odor, it has a relatively high viscosity, it lacks spreadable characteristics and it exhibits undesirable drawing and sticking properties. Recent efforts to overcome these disadvantages have resulted in the production of water-in-oil emulsions which utilize as the emulsifier, mixtures of oxypropylene polyglycerol alcohol and magnesium isostearate, succinic esters of polyoxyalkylene fatty alcohol or oxypropylene oxyethylene alcohols.

It has now been found that yet another type of emulsifier can be employed which makes it possible to produce an emulsion of the water-in-oil type in an economical manner for use in the preparation of cosmetic, and even pharmaceutical compositions, which are very stable when kept for a considerable length of time and which can be subjected to temperatures substantially above and below room temperature without being adversely affected.

One object of the present invention is to provide a new article of manufacture which consists of a stable, essentially irreversible emulsion of the water-in-oil type comprising a discontinuous aqueous internal phase, a continuous oil external phase and as an emulsifying agent a mixture of (a) a member selected from the group consisting of a metal lanolate, alkaline earth metal lanolate and their mixtures, and (b) a member selected from the group consisting of hydrogenated lanolin, lanolin alcohol and their mixtures.

The metal and alkaline earth metal lanolates are selected from the group consisting of magnesium, calcium, lithium, zinc and aluminum lanolates and can be obtained from lanolic acid which, in turn, can be obtained by the hydrolysis of lanolin which is made up of about 94% fatty acid esters.

These lanolates can be prepared, for instance, by initially hydrolyzing lanolin to produce lanolic acid, the latter being a rather complex mixture of fatty acids including, particularly, aliphatic acids, substituted or not, and hydroxy acids. Up to 36 different fatty acids have been identified in lanolic acid.

Starting with the lanolic acid the aforementioned lanolates can be prepared by, for instance, the following two procedures: (1) by double decomposition or by (2) direct reaction of (a) a metal hydroxide or (b) an alkaline earth metal hydroxide with the said lanolic acid. When the double decomposition route is chosen, the method comprises initially preparing an aqueous isotropic solution of the sodium or potassium salt of lanolic acid and adding thereto an inorganic salt such as the chloride of the desired metal or alkaline earth metal lanolate to precipitate said desired metal or alkaline earth metal lanolate.

The hydrogenated lanolin which can be used alone or in admixture with lanolin alcohol and which is used in combination with the metal and/or alkaline earth metal lanolate as the emulsifier of the present invention, is a mixture of alcohols obtained by the catalytic hydrogenation of lanolin, the latter as stated above being made up of about 94 percent fatty acid esters.

Thus, the preparation of hydrogenated lanolin consists first in the hydrogenolysis of lanolin (or lanolin esters) to produce a mixture of free acids and alcohols, followed by the catalytic reduction of the free acids into their corresponding alcohols. This preparation can be represented schematically as follows:

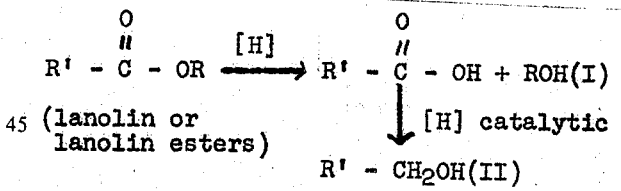

Hydrogenated lanolin is a mixture of alcohols (I) and (II).

A publication describing the preparation of hydrogenated lanolin is the Tenside Review, 3, No. 2, 1966, p. 45 by Stockdorn, Konig and Birk. Commercially, hydrogenated lanolin is available under the tradename HYDROLAN (Melting point 48°–53° C), HYDROXOL and SUPER-SAT (melting point 48°–50° C.). Hydrogenated lanolin is practically odorless and tasteless and has a pale straw color. It is not believed that at this time it has been possible to determine accurately the exact composition of hydrogenated lanolin.

The lanolin alcohol which can be used alone or in admixture with hydrogenated lanolin and which is used in combination with the metal and/or alkaline earth metal lanolate as the emulsifier of the present invention is prepared by the hydrolysis of the esters constituting lanolin. According to studies made, lanolin alcohol is made up of about 33 different alcohols classifiable into three distinct groups, i.e., aliphatic alcohols, triterpenoic alcohols and sterols. Commercially, lanolin alcohol is available under the tradenames HARTOLAN, SUPER-HARTOLAN and LANOCERINA.

The hydrogenated lanolin and lanolin alcohol employed in the present invention preferably have a hydroxyl number between 130 and 170, a drop point between 34° and 70° C. and a peroxide number less than or equal to 10.

In the emulsifier of the present invention the weight ratio of (a) the metal and/or alkaline earth metal lanolate to (b) the hydrogenated lanolin and/or lanolin alcohol ranges between 80 — 10:20 — 90 and is preferably 30:70. It has been found that deviating from the above ratios results in the production of an emulsion exhibiting a poorer quality in terms for instance of its fineness and required stability.

The water-in-oil emulsion of the present invention comprises, as indicated above, a discontinuous aqueous internal phase, a continuous oil external phase and the said emulsifying agent. Relative to the total weight of said emulsion, the emulsifying agent is present in amounts of about 3–50 weight per cent and preferably between 8 – 12 weight per cent. Further, the weight ratio of the continuous oil external phase to said emulsifying agent ranges between 95 — 20:5 — 80.

Representative materials usefully employed to produce the continuous oil external phase of the water-in-oil emulsion of the present invention include hydrocarbon oils such as paraffin oil, purcellin oil, perhydrosqualene and solutions of microcrystalline wax in oil; animal or vegetable oils such as sweet almond oil, avocado oil, calophyllum oil, lanolin, castor oil, horse oil, hog oil, and olive oil; mineral oils whose initial distillation point at atmospheric pressure is about 250° C. and whose final distillation point is about 410° C and saturated esters such as isopropyl palmitate, alkyl myristates such as isopropyl, butyl and cetyl myristates, hexodecyl stearate, ethyl palmitate, octanoic and decanoic acid triglycerides and cetyl ricinoleate.

If desired, there can also be included in the continuous oil external phase, silicone oils which are soluble in the other selected oil component. Representative silicon oils include dimethylpolysiloxane, methylphenylpolysiloxane and silicone-glycol polymer.

Further, if desired, a wax material can also be included in the continuous oil external phase. It has been found that the presence of such a wax component often promotes the retention of the oils. Representative waxes employed include, for instance, carnauba wax, candellila wax, beeswax, microcrystalline wax and ozokerite.

The water-in-oil emulsions of the present invention, as stated hereinbefore, can be employed to produce cosmetic compositions. Generally, when employed as such, the discontinuous aqueous internal phase comprises water in amounts of about 5 – 70 weight per cent of said emulsion.

In one embodiment of the cosmetic composition of the present invention, the said cosmetic composition can be in the form of a cream such as a hydrating solar cream, a hydrating cream for the face, hands or body, or a hydrating rouge or base make-up formulation. When the cosmetic composition is in the form of a cream, the concentration of water ranges between about 20 – 70 and preferably about 40 – 60 weight per cent of the total weight of the emulsion.

In another embodiment of the cosmetic composition of the present invention, the said cosmetic composition can be in a shaped form, such as a stick. Thus, the cosmetic composition can be a hydrating solar stick, a hydrating or moisturizing stick for the face or body, a lipstick or eye make-up plate or stick. When the cosmetic composition is in a shaped form, the concentration of water can range between about 5 – 70 weight per cent of the total weight of the emulsion.

Moreover, the cosmetic compositions of the present invention can also include conventional cosmetic adjuvants such as dyes, pigments, perfumes, and preservatives such as methyl parahydroxybenzoate or propyl parahydroxybenzoate, the latter being especially advantageous for increasing the stability and ease of preserving the emulsion. Further, when the cosmetic compositions of this invention are to be used to improve the appearance of the skin, such as anti-acne creams or sticks, the composition can also include active components such as S-substituted derivatives of cysteine or cysteamine.

The present invention is also directed to a three stage process of producing the water-in-oil emulsions, as defined above. In the first stage, the metal and/or alkaline earth metal lanolate is dissolved in the material constituting the oil phase of the emulsion at a temperature of about 100° C, the dissolution being accompanied by vigorous stirring. In the second stage, the hydrogenated lanolin and/or lanolin alcohol is dissolved in the mixture resulting from the first stage at a temperature of about 80° C.

When the water-in-oil emulsion of this invention is contemplated for use as a cosmetic composition in cream form, the third stage comprises cooling the mixture resulting from the second stage to a temperature of about 40° C and admixing therewith, with vigorous stirring, the material constituting the water phase of the emulsion, said material comprising water in amounts of about 20 – 70 weight per cent of the total emulsion. Thereafter the resulting emulsion is cooled to ambient temperatures while stirring. Subsequently, if desired, the thus produced emulsion can be refined by passing it to a roller mill.

When the water-in-oil emulsion of this invention is contemplated for use as a shaped cosmetic composition, the third stage comprises introducing into the uncooled mixture resulting from the second stage with vigorous stirring, the material constituting the water phase of the emulsion, said material comprising water, previously heated to 80° C., in amounts of about 5 – 70 weight per cent of the total emulsion and then shaping the resulting mixture into the desired form as by pouring the same into a mold to produce sticks.

For a better understanding of the invention the following examples are presented.

EXAMPLE 1

Preparation of metal or Alkaline Earth Metal Lanolates

Preparation of Magnesium Lanolate

1. Double Decomposition Method

Into a 2-liter beaker placed on a gas heater, there are placed 1 liter of boiling demineralized water and 100 g of lanolic acid (saponification number 174 and iodine number 22). Then, 32.8 g of 50.9 percent potash are added at 100°C with stirring. A slightly turbid isotropic solution is thus obtained. Stirring is continued for 15 minutes. A check is then made to see that the lanolic acid has completely been neutralized. The solution is allowed to cool to about 50° C.

At this temperature, there is then added, with continued stirring, an aqueous solution containing 29.7g of magnesium chloride 6 $H_2O$. At the time of addition, a precipitate is formed by separating from the "water" phase. Then the mixture is cooled with stirring to ambient temperature. At about 30° C., the precipitate becomes very fine and looks like a milk. Stirring is continued for about 1 hour. The precipitate is then drained on a Buchner, washed five times with 300 ml of water and then dried in a vacuum oven. Magnesium content: 2.76 percent (yield: 95 percent).

2. Method by Direct Reaction of Magnesium Hydroxide on Lanolic Acid

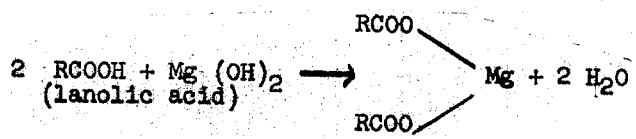

In a first stage, 5.20 kg (13 moles) of lanolic acid in 5.150 kg of permuted water are subjected to distillation with steam to purify the lanolic acid and to eliminate its odor. The amount of water distilled during distillation is about 15 liters, or 3 times the weight of the lanolic acid. The distillation is stopped by maintaining the initial amount of water and there are introduced, under nitrogen, in the flask having served for distillation, 5.150 kg of vaseline oil and 395 g (6.5 moles) of 96 percent hydrated magnesia, at a temperature of abut 90° – 95° C. The temperature is maintained for 1 hour at 95° – 100° C for 30 minutes under vacuum with a blade pump. The yield is about 93 percent.

The product is in the form of a solution of magnesium lanolate in vaseline oil and is used directly in the preparation of the emulsions of this invention.

The processes for preparing magnesium lanolate which have just been described can be used for the preparation of other metal or alkaline earth metal lanolates. Thus, for example, aluminum lanolate can be obtained in the double decomposition method by using aluminum chloride rather than magnesium chloride. Lithium lanolate can be prepared by direct action of lithium hydroxide on lanolic acid, using essentially the same procedures outlined above.

The compositions described in the following examples have been, in each case, obtained by preparing the emulsions as described above.

EXAMPLES OF COMPOSITIONS

EXAMPLE 2

A hydrating face cream having the following composition is prepared:

| | | |
|---|---|---|
| Magnesium Lanolate | 2.85 | g |
| Lanolin Alcohol | 6.65 | g |
| Isopropyl Palmitate | 22.175 | g |
| Parafin Oil | 26.025 | g |
| Sweet Almond Oil | 0.3 | g |
| Ozokerite | 2.0 | g |
| Water + Methyl Parahydroxybenzoate (0.1 g) | 40.0 | g |

EXAMPLE 3

A hydrating face cream having the following composition is prepared:

| | | |
|---|---|---|
| Magnesium Lanolate | 0.9 | g |
| Lanolin Alcohol | 8.1 | g |
| Mineral Oil (sold under the tradename "H₂N₂₅" and having a viscosity of 0.4 poise, a density of 0.749 and boiling point 279–392°C) | 38.7 | g |
| Avocado Oil | 0.3 | g |
| Ozokerite | 2.0 | g |
| Water + Propyl Parahydroxybenzoate (0.2 g) | 50.0 | g |

EXAMPLE 4

A hydrating face cream, having the following composition is prepared:

| | | |
|---|---|---|
| Magnesium Lanolate | 14.4 | g |
| Lanolin Alcohol | 3.6 | g |
| Isopropyl Myristate | 30.0 | g |
| Paraffin Oil | 28.0 | g |
| Ozokerite | 4.0 | g |
| Water + Methyl Parahydroxybenzoate (0.1 g) | 20.0 | g |

EXAMPLE 5

A hydrating face cream having the following composition is prepared:

| | | |
|---|---|---|
| Magnesium Lanolate | 2.4 | g |
| Lanolin Alcohol | 0.6 | g |
| Mineral Oil (as in Example 3) | 44.0 | g |
| Beeswax | 3.0 | g |
| Water + Propyl Parahydroxybenzoate (0.3 g) | 50.0 | g |

EXAMPLE 6

A hydrating face cream having the following composition is prepared:

| | | |
|---|---|---|
| Magnesium Lanolate | 10.0 | g |
| Lanolin.Alcohol | 40.0 | g |
| Mineral Oil (same as in Example 3) | 9.0 | g |
| Microcrystalline Wax | 1.0 | g |
| Water + Methyl Parahydroxybenzoate (0.2 g) | 40.0 | g |

EXAMPLE 7

A hydrating face cream having the following composition is prepared:

| | | |
|---|---|---|
| Aluminum Lanolate | 10.0 | g |
| Lanolin Alcohol | 40.0 | g |
| Mineral Oil (as in Example 3) | 8.0 | g |
| Ozokerite | 2.0 | g |
| Water + Methyl Parahydroxybenzoate (0.1 g) | 40.0 | g |

EXAMPLE 8

A colored hydrating cream having the following composition is prepared:

| | | |
|---|---|---|
| Magnesium Lanolate | 4.25 | g |
| Lanolin Alcohol | 4.25 | g |
| Paraffin Oil | 30.5 | g |
| Purcellin Oil | 4.0 | g |
| Silicone Oil (sold under the tradename "SI 555", viscosity 25°C/ | 2.0 | g |

-Continued cSK 15-25, density at 25° C 1.05-1.08, refraction index 1.485-1.495 (methylphenylpolysiloxane))

| | |
|---|---|
| Ozokerite | 2.0 g |
| Water + Propyl Parahydroxybenzoate (0.1 g) | 50.0 g |
| Red Iron Oxide | 0.7 g |
| Yellow Iron Oxide | 0.8 g |
| Titanium Oxide | 1.5 g |

EXAMPLE 9

A hydrating body cream having the following composition is prepared:

| | |
|---|---|
| Lithium Lanolate | 5.0 g |
| Lanolin Alcohol | 7.5 g |
| Perhydrosqualene | 25.5 g |
| Ozokerite | 2.0 g |
| Water + Methyl Parahydroxybenzoate (0.2 g) | 60.0 g |

EXAMPLE 10

A hand cream having the following composition is prepared:

| | |
|---|---|
| Magnesium Lanolate | 0.9 g |
| Lanolin Alcohol | 2.1 g |
| Mineral Oil (as in Example 3) | 23.0 g |
| Titanium Oxide | 2.0 g |
| Ozokerite | 2.0 g |
| Water + Propyl Parahydroxybenzoate (0.2 g) | 70.0 g |

EXAMPLE 11

A hydrating solar cream having the following composition is prepared:

| | |
|---|---|
| Magnesium Lanolate | 4.25 g |
| Lanolin Alcohol | 4.25 g |
| Paraffin Oil | 28.5 g |
| Purcellin Oil | 3.0 g |
| 2-Octyl 1-Dodecanol | 3.0 g |
| Parsol-Ultra (solar filter, mixture of substituted aminobenzoic acid esters and substituted cinnamic acid esters) | 5.0 g |
| Ozokerite | 2.0 g |
| Water + Propyl Parahydroxybenzoate (0.1 g) | 50.0 g |

EXAMPLE 12

A hydrating rouge having the following composition is prepared:

| | Grams |
|---|---|
| Magnesium lanolate | 0.9 |
| Lanolin alcohol | 2.1 |
| Paraffin oil | 42.55 |
| Ozokerite | 2.0 |
| Water plus methyl parahydroxybenzoate (0.1 g.) | 50.0 |
| Dye (D and C Red No. 8), having the formula: | 0.85 |

[Chemical structure: a naphthalene ring bearing OH, linked by -N=N- to a benzene ring bearing CH$_3$, Cl and SO$_3$Na]

| | |
|---|---|
| Black iron oxide | 0.1 |
| Titanium oxide | 1.5 |

EXAMPLE 13

A hydrating base make-up having the following composition is prepared:

| | |
|---|---|
| Magnesium Lanolate | 2.85 g |
| Hydrogenated Lanolin | 6.65 g |
| Mineral Oil (as in Example 3) | 40.5 g |
| Isopropyl Lanolate | 2.0 g |
| Ozokerite | 3.0 g |
| Water + Propyl Parahydroxybenzoate (0.3 g) | 50.0 g |
| Iron Oxide + Titanium Oxide | 5.0 g |

EXAMPLE 14

A hydrating face stick having the following composition is prepared:

| | |
|---|---|
| Magnesium Lanolate | 2.55 g |
| Lanolin Alcohol | 5.95 g |
| Perhydrosqualene | 7.0 g |
| Paraffin Oil | 19.5 g |
| Ozokerite | 15.0 g |
| Water + Propyl Parahydroxybenzoate (0.2 g) | 50.0 g |

EXAMPLE 15

A hydrating body stick having the following composition is prepared:

| | |
|---|---|
| Magnesium Lanolate | 2.28 g |
| Lanolin Alcohol | 5.32 g |
| Purcellin Oil | 3.0 g |
| Mineral Oil (as in Example 3) | 12.1 g |
| Ozokerite | 7.3 g |
| Water + Methyl Parahydroxybenzoate (0.25 g) | 70.0 g |

EXAMPLE 16

A hydrating solar stick having the following composition is prepared:

| | |
|---|---|
| Magnesium Lanolate | 3.8 g |
| Hydrogenated Lanolin | 5.7 g |
| Ozokerite | 21.0 g |
| Isopropyl Palmitate | 10.0 g |
| Paraffin Oil | 24.5 g |
| "Parsol-Ultra" (As in Example 11) | 5.0 g |
| Water + Propyl Parahydroxybenzoate (0.1 g) | 30.0 g |

EXAMPLE 17

An anti-acne stick having the following composition is prepared:

| | |
|---|---|
| Zinc Lanolate | 2.85 g |
| Hydrogenated Lanolin | 6.65 g |
| Mineral Oil (as in Example 3) | 15.5 g |
| Perhydrosqualene | 10.0 g |
| Ozokerite | 15.0 g |
| S-(Carboxymethyl)-1-Cysteine | 6.0 g |
| Water + Propyl Parahydroxybenzoate (0.15 g) | 44.0 g |

EXAMPLE 18

A lipstick having the following composition is prepared:

|  | Grams |
|---|---|
| Magnesium lanolate | 1.5 |
| Hydrogenated lanolin | 4.0 |
| Beeswax | 8.0 |
| Carnauba wax | 6.0 |
| Ozokerite | 20.0 |
| Lanolin | 10.0 |
| Mineral oil (as in Example 3) | 37.2 |
| Water plus propyl parahydroxybenzoate (0.25 g.) | 10.0 |
| Dye (D and C Orange No. 17) having the formula: | 0.5 |

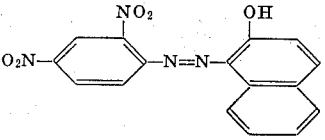

| Dye (D and C Red No. 8, as in Example 12) | 0.5 |
|---|---|
| Titanium oxide | 2.3 |

EXAMPLE 19

A lipstick having the following composition is prepared:

| Magnesium Lanolate | | 1.5 | g |
|---|---|---|---|
| Lanolin Alcohol | | 2.0 | g |
| Hydrogenated Lanolin | | 4.0 | g |
| Isopropyl Lanolate | (sold under the tradename "Amerlate P") | 5.0 | g |
| Candellila Wax | | 4.0 | g |
| Ozokerite | | 20.0 | g |
| Lanolin | | 10.0 | g |
| Paraffin Oil | | 48.5 | g |
| Water + Methyl Parahydroxybenzoate (0.1 g) | | 5.0 | g |

EXAMPLE 20

A lipstick, having the following composition is prepared:

| Magnesium Lanolate | 10.0 | g |
|---|---|---|
| Lanolin Alcohol | 40.0 | g |
| Mineral Oil (as in Example 3) | 10.0 | g |
| Beeswax | 5.0 | g |
| Ozokerite | 25.0 | g |
| Water | 10.0 | g |

EXAMPLE 21

An eye make-up stick having the following composition is prepared:

| Magnesium Lanolate | 3.8 | g |
|---|---|---|
| Hydrogenated Lanolin | 5.7 | g |
| Ozokerite | 15.0 | g |
| Isopropyl Palmitate | 10.0 | g |
| Paraffin Oil | 13.5 | g |
| Iron Oxide + Titanium Oxide | 2.0 | g |
| Water + Propyl Parahydroxybenzoate (0.3 g) | 50.0 | g |

EXAMPLE 22

A hydrating make-up stick having the following composition is prepared:

| Magnesium Lanolate | 1.0 | g |
|---|---|---|
| Lanolin Alcohol | 3.0 | g |
| Hydrogenated Lanolin | 4.5 | g |
| 2-Octyl 1-Dodecanol | 1.5 | g |
| Ozokerite | 21.0 | g |
| Isopropyl Lanolate | 6.0 | g |
| Mineral Oil (as in Example 3) | 21.9 | g |
| Talc | 6.6 | g |
| Iron Oxide + Titanium Oxide | 5.5 | g |
| Water + Methyl Parahydroxybenzoate (0.25 g) | 30.0 | g |

EXAMPLE 23

A rouge make-up stick having the following composition is prepared:

| Calcium Lanolate | 2.4 | g |
|---|---|---|
| Lanolin Alcohol | 0.6 | g |
| Ropy Petroleum Jelly (Vaseline) | 30.5 | g |
| Ozokerite | 15.0 | g |
| Water + Propyl Parahydroxybenzoate (0.15 g) | 50.0 | g |
| Titanium Oxide + Iron Oxide | 1.5 | g |

It is understood that the embodiments of the invention which have been described have been given only by way of example and that they can receive any desirable modification, without thereby going outside the scope of the invention.

In particular, it is clear that it is possible to use simultaneously several emulsifiers according to the invention and if desired with other previously known emulsifiers.

Finally, it will be understood that the emulsions according to the invention can also be used in fields other than those of cosmetics and excipients for pharmaceutical products.

What is claimed is:

1. A water-in-oil emulsion for use in the preparation of cosmetic compositions consisting essentially of a discontinuous aqueous internal phase, a continuous oil external phase and an emulsifying agent to emulsify said aqueous internal phase and said external oil phase, said emulsifying agent being a mixture of (a) a lanolate selected from the group consisting of magnesium lanolate, aluminum lanolate, lithium lanolate, zinc lanolate and calcium lanolate and (b) a member selected from the group consisting of hydrogenated lanolin, lanolin alcohol, and mixtures thereof, the weight ratio of (a) : (b) being between 80—10:20—90, said emulsifying agent being present in amounts of 3–50 percent by weight of said emulsion, the weight ratio of said continuous oil external phase to said emulsifying agent being between 95—20:5—80 and said aqueous internal phase being present in amounts of 5–70 percent by weight of said emulsion.

2. The water-in-oil emulsion of claim 1, wherein said emulsifying agent is present in amounts of 8 – 12 percent by weight of the total weight of the emulsion.

3. The water-in-oil emulsion of claim 1, wherein said continuous oil external phase comprises a member selected from the group consisting of paraffin oil, Purcellin oil, perhydrosqualene, a solution of microcrystalline wax in oil, sweet almond oil, avocado oil, calophyllum oil, lanolin, castor oil, horse oil, hog oil, olive oil, mineral oil having at atmospheric pressure an initial distillation point of about 250° C. and a final distillation point of about 410° C., isopropyl palmitate, isopropyl myristate, butyl myristate, cetyl myristate, hexadecyl myristate, octanoic acid triglyceride, decanoic acid triglyceride, cetyl ricinoleate and mixtures thereof.

4. The water-in-oil emulsion of claim 1, wherein said continuous oil external phase also includes a wax selected from the group consisting of carnauba wax, candellila wax, beeswax, microcrystalline wax and ozokerite.

5. The water-in-oil emulsion of claim 1, wherein said discontinuous aqueous internal phase comprises water in an amount between 20 and 70 percent by weight of said emulsion.

6. The cosmetic composition of claim 5, wherein said water is present in an amount between 40 – 60 per cent by weight of said emulsion.

* * * * *